United States Patent [19]

Fortenberry

[11] Patent Number: 4,984,674
[45] Date of Patent: Jan. 15, 1991

[54] TIPPING APPARATUS AND METHOD FOR TILTING CARRIER CONVEYOR

[76] Inventor: John D. Fortenberry, 644 Pressley Rd., Charlotte, N.C. 28210

[21] Appl. No.: 487,983
[22] PCT Filed: Nov. 4, 1988
[86] PCT No.: PCT/US88/03927
 § 371 Date: Feb. 26, 1990
 § 102(e) Date: Feb. 26, 1990
[87] PCT Pub. No.: WO89/04285
 PCT Pub. Date: May 18, 1989

[30] Foreign Application Priority Data
 Nov. 6, 1987 [AU] Australia .................. PI5274

[51] Int. Cl.⁵ .............................. B65G 37/00
[52] U.S. Cl. ..................... 198/365; 198/477.1
[58] Field of Search ......... 198/365, 370, 372, 476.1, 198/477.1, 802, 706

[56] References Cited
U.S. PATENT DOCUMENTS
3,865,226 2/1975 Scata .................... 198/365
4,856,642 8/1989 Nicholson et al. ......... 198/365

Primary Examiner—H. Grant Skaggs
Assistant Examiner—Cheryl L. Gastineau
Attorney, Agent, or Firm—Rhodes, Coats and Bennett

[57] ABSTRACT

A tipping apparatus for a tilting carrier conveyor, a conveyor, and method useful with conveyors having an elongate track (10) and a plurality of carriers (11) movable along the track. In subcombination form, the tipping apparatus has a carrier tipping device (20) mounted for rotation about an axis adjacent to the track and between first and second rotational positions, such that the tipping device is withdrawn from contact with any carrier (11) passing thereadjacent in the first position (FIG. 1) and disposed for engagement by any carrier passing thereadjacent in the second (FIG. 2). A biasing element such as a spring (24) is operatively connected with the tipping device for biasing it toward said second rotational position. A controllably releasable member (25) engages the tipping device for controllably restraining it against rotation from said first rotational position toward said second rotational position.

27 Claims, 1 Drawing Sheet

TIPPING APPARATUS AND METHOD FOR TILTING CARRIER CONVEYOR

FIELD AND BACKGROUND OF INVENTION

This invention relates to tilting carrier conveyors of the type used to sort packages, parcels or the like and more particularly to an apparatus and method for tipping the carriers of such a conveyor or sortation system.

Tilting carrier conveyor systems are known and are shown, for example, in Speaker U.S. Pat. No. 3,945,485: Speaker et al U.S. Pat. No. 4,102,448; Venzke U.S. Pat. No. 4,174,773; and Prydtz U.S. Pat. No. 4,635,785. The general arrangement of such systems includes a track and a driven conveying chain or the like on which are mounted a number of carriers, spaced along the chain. Each carrier has a portion, often similar to a tray, which is mounted for normal positioning essentially horizontally level and for tipping to one, the other, or both sides of the direction of movement of the chain. Parcels or the like to be sorted are carried on the trays and transported by the conveyor to a location where sorting is to occur. At the sorting location, trays or carriers are tipped to one side or the other to discharge the transported article from the conveyor. Typically, control over tipping is exercised by some sortation controlling means such as a computer which controls a tipping device.

Prior tipping devices have been pneumatically actuated cylinder devices in which some striker element or the like is moved upwardly into the path of an advancing carrier, to engage an actuating cam or the like on the carrier and cause tipping. As sortation speeds have increased, and the linear speed of the chain and carriers have risen, difficulty has been encountered in operating a tipping device quickly enough to achieve proper sortation while retracting the device from the path of an oncoming carrier so as to avoid damage to the sortation system. Where the mechanism provided for retraction of a reciprocating tipping device fails to operate as needed, substantial damage to a conveyor system follows, such as by demounting, destroying, or seriously damaging a series of carriers which strike an improperly retracted or unretracted tipping device.

BRIEF DESCRIPTION OF INVENTION

With the foregoing in mind, it is an object of this invention to achieve tipping of carriers in a conveying system of the type described while substantially eliminating the possibility of damage to the system. In realizing this object of the invention, a tipping device is contemplated which is operated by the movement of the carriers and which is reset into a retracted or non-tipping position by the action of a tipped carrier.

Yet a further object of this invention is to tip carriers of a sortation system of the types described in accordance with a method in which the tipping action is especially smooth and with minimal jarring or impact. In realizing this object of the present invention, a tipping method is followed in which the movements which occur in tipping are rotary, as distinguished from reciprocating or linear.

Yet a further object of this invention is to tip carriers of a sortation systems of the type described through controlled engagement thereof with a rotating segment of a wheel, released into the path of an oncoming carrier by a simple electromechanical actuator. In realizing this object of the present invention, speed of operation of a tipping device is accommodated to the operating speed of the system and the possibility of increasing the speed of operation of such systems is improved.

BRIEF DESCRIPTION OF DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawings, the tipping apparatus contemplated by this invention is there shown as used in a conveying system which has an elongate track 10. The track 10 is associated with a driven chain which has a plurality of carriers (one of which is indicated at 11 in FIG. 3) which move along the track as drawn by the chain. The track and carriers are essentially conventional and may be constructed, for example, in accordance with any of the prior patents mentioned above as relevant to the background of this invention.

Figure 1:
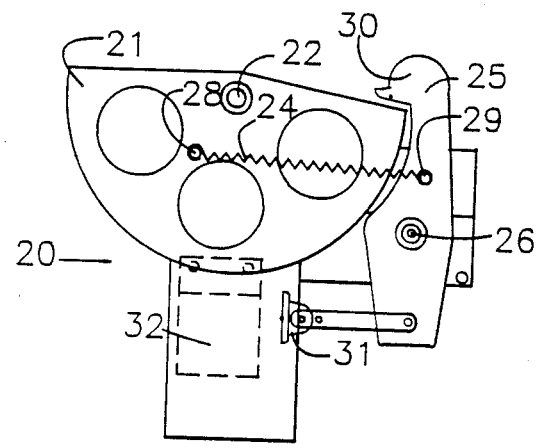
FIG. 1 is an angled elevation view, from the side, of a tipping device in accordance with this invention, in a "cocked" position.
Figure 2:
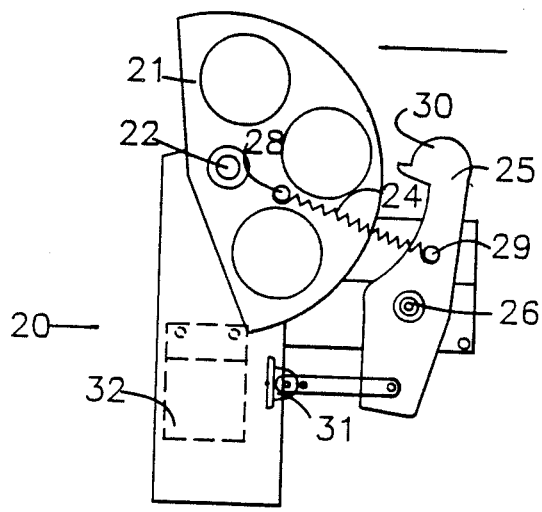
FIG. 2 is a view similar to FIG. 1, showing the device of FIG. 1 in a "fired" position.

Mounted adjacent the track 10 is the tipping device of this invention, generally indicated at 20. The device has a rotating member 21 which, as illustrated, takes the form of a segment of a wheel which approximates one half of a circle. The rotating member is mounted on a stub shaft 22 for rotation. The diameter of the member 21, and the position of the stub shaft 22 relative to the path followed by carriers 11, are such that the member 21 rotates between a "cocked" position (FIG. 1) in which it is withdrawn from contact with any carrier passing thereover and a "fired" position (FIG. 2) in which it is raised or extended for engagement with any carrier passing thereover. The member 21 is normally freely rotatable on the stub shaft 22.

The rotating member is held in cocked position and urged into fired position by the cooperation of means for biasing the member to rotate toward the fired position and catch or dog means for restraining the member against rotation into fired position. In the form illustrated, the biasing means takes the form of an overcenter spring 24 and the catch means takes the form of an element which is here referred to as a "bird" 25. The bird is an elongated member mounted for pivotal movement about an axis defined by a shaft 26 and located approximately midway of the length of the member.

The spring 24 is a tension spring, exerting force on elongation, and is fastened between an eccentric pin 28 on the rotating member 21 and a pin 29 mounted on the bird 25. One end of the bird is configured with a catch portion or "beak" 30 which, in cocked position, engages and captures a generally radial surface of the rotating member 21, holding the member against rotation. The pin 29 on the bird to which one end of the spring 24 is attached is located intermediate the beak 30 and the axis defined by the shaft 26 about which the bird pivots. In that position, the spring 24, being attached to the rotating member 21 at a location spaced radially from the axis of rotation thereof and being stretched, imposes on the rotating member and bird a force giving rise to torques which seek to rotate the member 21 toward a "fired" or raised, tipping position (counterclockwise in FIGS. 1 and 2) and the bird 25 toward a restraining or capturing position (clockwise in FIGS. 1 and 2).

In order to provide for actuation of the tipping device contemplated by this invention, the bird 25 is coupled by an appropriate linkage to the moving core 31 of a solenoid 32. This linkage engages the bird at a location remote from the beak portion 30 (in the form illustrated), and acts to withdraw the beak from restraining the rotating member or segment of a wheel when the solenoid is energized. Thus a direct electromechanical actuation is achieved. When the solenoid 32 is momentarily energized, the bird 25 is moved (clockwise in FIGS. 1 and 2) to withdraw the beak portion from restraining engagement with the segment of a wheel 21 and the segment of a wheel is rotated (counterclockwise in FIGS. 1 and 2) by the torque exerted by the biasing means into the "fired" position in which it is raised for engagement with the next passing carrier 11.

Figure 3:
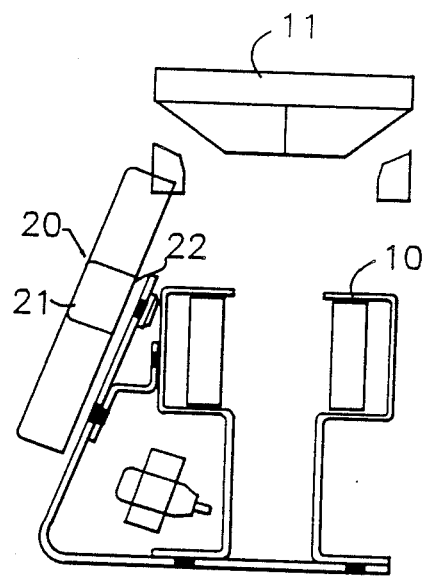
FIG. 3 is an elevation view, looking longitudinally, of a conveyor incorporation the tipping device of FIGS. 2 and 3, showing a carrier in conveying position and a tipping device in cocked position.

The method of operation of the tipping device 20 contemplated by this invention may best be understood by reference to FIG. 3 as the following discussion proceeds. With the tipping device in cocked position, the rotating member or wheel 21 is restrained in a lowered position such that no portion of the wheel rises sufficiently toward the path of movement of the carriers as to engage any passing carrier. Thus carriers may traverse the tipping device location without discharge of any parcel or article carried.

When it is desired that a carrier traversing the tipping device location should be moved to discharge any article carried, as when a controlling system such as a computer determines that sortation should occur at the device location, then the corresponding solenoid 32 is energized for a brief interval immediately after the carrier preceding the carrier to be tipped has cleared the device. With the energization of the solenoid, the bird 25 is moved to disengage the beak portion 30 from the rotating member and the segment of a wheel moves, under the impetus of the spring 24, to the fired position. In that position, the radius of the circular portion of the rotating member, measured from the axis of rotation defined by the stub shaft 22, is such that the raised portion of the member will engage the next following carrier 11.

With engagement of the rotating member and the carrier, two movements occur. One is tipping movement of the carrier, in a manner substantially similar to that which has been known heretofore in prior systems such as those described in the prior patents identified hereinabove. The other is that the engaged carrier 11, with its forward movement along the track 10, drives the rotating member 21 in rotation through an arc sufficient to carry the spring 24 through the overcenter position (in which the line of action of the spring passes directly through the center of rotation of the rotating member) and to a point such that the member is again biased toward the cocked position as herein defined. Thus the device 20 of the present invention is, in essence, reset by the very tipping operation which it initiates and controls and is thereby readied for a next subsequent operation in timed relation to the speed of the conveying system. As will also be appreciated by the thoughtful reader, all movement of the rotating member and catch means is rotary, as distinguished from linear and reciprocal, and is thus accomplished with lessened shock, impact loading and the like.

In the drawings and specifications there has been set forth a preferred embodiment of the invention and, although specific terms are used, the description thus given uses terminology in a generic and descriptive sense only and not for purposes of limitation.

What is claimed is:

1. A tipping apparatus for a tilting carrier conveyor having an elongate track and a plurality of carriers movable along the track, the tipping apparatus comprising:

carrier tipping means mounted for rotation about an axis adjacent to the track and between first and second rotational positions, said first rotational position being such that said tipping means is withdrawn from contact with any carrier passing thereadjacent and said second rotational position being such that said tipping means is disposed for engagement by any carrier passing thereadjacent, said tipping means for controllably engaging and tilting carriers as the same move along the track, biasing means operatively connected with said tipping means for biasing said tipping means towards said second rotational position, and controllably releasable means engaging said tipping means for controllably restraining said tipping means against rotation from said first rotational position toward said second rotational position.

2. Apparatus according to claim 1 wherein said tipping means is mounted for movement from said second rotational position to said first rotational position under impetus of engagement with a carrier passing thereadjacent.

3. Apparatus according to claim 1 wherein said tipping means has a configuration, when projected onto a plane which is perpendicular to the axis of rotation of said tipping means, which has a part circular periphery.

4. Apparatus according to claim 1 wherein said tipping means has a configuration, when projected onto a plane which is perpendicular to the axis of rotation of said tipping means, which is a segment of a circle.

5. Apparatus according to claim 1 wherein said axis of rotation of said tipping means is substantially perpendicular to the longitudinal axis of the track.

6. Apparatus according to claim wherein said biasing means comprises spring means coupled to said tipping means and urging said tipping means towards one particular rotational position.

7. Apparatus according to claim 6 wherein said spring means applies force to said tipping means at a point thereon spaced from said axis of rotation of said tipping means.

8. Apparatus according to claim 1 wherein said releasable means comprises catch means mounted adjacent said tipping means for pivotal movement between latched and unlatched positions and remotely actuable means for moving said catch means from said latched position to said unlatched position, said catch means on movement to said unlatched position releasing said tipping means for movement from said first rotational position to said second rotational position.

9. Apparatus according to claim 8 wherein said biasing means comprises spring means coupled between said tipping means and said catch means and urging said tipping means towards said second rotational position and said catch means towards said latched position.

10. In a tilting carrier conveyor comprising an elongate track, a plurality of carriers mounted for movement along said track and adjacent a plurality of sorting locations, each said carrier having a substantially horizontal supporting surface, and means for moving said carriers along said track, an improvement in tipping apparatus for controllably tipping said carriers at the sorting locations, the improvement comprising:

carrier tipping means mounted for rotation about an axis adjacent to the track and between first and second rotational positions, said first rotational position being such that said tipping means is withdrawn from contact with any carrier passing thereadjacent and said second rotational position being such that said tipping means is disposed for engagement by any carrier passing thereadjacent, said tipping means for controllably engaging and tilting carriers as the same move along the track, biasing means operatively connected with said tipping means for biasing said tipping means towards said second rotational position, and controllably releasable means engaging said tipping means for controllably restraining said tipping means against rotation from said first rotational position toward said second rotational position 11. Apparatus according to claim 10 wherein said tipping means is mounted for movement from said second rotational position to said first rotational position under impetus of engagement with a carrier passing thereadjacent.

12. Apparatus according to claim 10 wherein said tipping means has a configuration, when projected onto a plane which is perpendicular to the axis of rotation of said tipping means, which has a part circular periphery.

13. Apparatus according to claim 10 wherein said tipping means has a configuration, when projected onto a plane which is perpendicular to the axis of rotation of said tipping means, which is a segment of a circle.

14. Apparatus according to claim 10 wherein said axis of rotation of said tipping means extends substantially perpendicularly to the longitudinal axis of the track and at an acute included angle with the horizontal surfaces of said carriers.

15. Apparatus according to claim 10 wherein said biasing means comprises spring means coupled to said tipping means and urging said tipping means towards one particular rotational position.

16. Apparatus according to claim 15 wherein said spring means applies force to said tipping means at a point thereon spaced from said axis of rotation of said tipping means.

17. Apparatus according to claim 10 wherein said releasable means comprises catch means mounted adjacent said tipping means for pivotal movement between latched and unlatched positions and remotely actuable means for moving said catch means from said latched position to said unlatched position, said catch means on movement to said unlatched position releasing said tipping means for movement from said first rotational position to said second rotational position.

18. Apparatus according to claim 17 wherein said biasing means comprises spring means coupled between said tipping means and said catch means and urging said tipping means towards said second rotational position and said catch means towards said latched position.

19. A method of controllably tipping carriers of a tilting conveyor system which has an elongate track and a plurality of tilting carriers mounted for movement therealong and comprising the steps of:

mounting adjacent the track a tipping device movable between a first position withdrawn from contact with carriers moving along the track and a second position disposed for engagement with carriers moving along the track, biasing the tipping device toward the second position while controllably engaging the tipping device and restraining the tipping device in the first position, controllably releasing the tipping device from restraint and thereby for biased movement toward the second position, engaging a passing carrier with the tipping device upon movement of the tipping device toward the second position for tilting the carrier, driving the tipping device from the second position toward the first position by engagement thereof with the passing carrier, and catching the tipping device as it moves to the first position.

20. A method according to claim 19 wherein the step of mounting a tipping device comprises disposing the tipping device for rotation about an axis perpendicular to the longitudinal axis of the track.

21. A method according to claim 19 wherein said step of mounting a tipping device comprises providing a tipping device which has a configuration, when projected onto a plane which is perpendicular to the axis of rotation of the tipping device, which has a part circular periphery.

22. A method according to claim 19 wherein said step of mounting a tipping device comprises providing a tipping device which has a configuration, when projected onto a plane which is perpendicular to the axis of rotation of said tipping means, which is a segment of a circle.

23. A method according to claim 19 wherein said step of biasing the tipping device comprises imposing a spring force on the tipping device and urging the tipping device toward one particular rotational position.

24. A method according to claim 23 wherein said step of imposing a spring force comprises applying force to the tipping device at a point thereon spaced from the axis of rotation of the tipping device.

25. A method according to claim 19 wherein said step of controllably engaging the tipping device comprises engaging the tipping device with a catch member mounted adjacent the tipping device for pivotal movement between latched and unlatched positions, the catch member on movement to the unlatched position releasing the tipping device for movement from the first rotational position to the second rotational position.

26. A method according to claim 25 wherein said step of biasing the tipping device comprises imposing a spring force between the tipping device and the catch member and urging the tipping device toward the second particular rotational position and the catch member toward the latched position.

27. A method according to claim 19 wherein said step of releasing the tipping device comprises moving the catch member from the latched position to the unlatched position.

* * * * *